(No Model.) 2 Sheets—Sheet 1.

O. L. F. BROWNE & G. A. PORTER.
Apparatus for the Manufacture of Salt.

No. 240,378. Patented April 19, 1881.

WITNESSES
C. Bendixon.
Wm. C. Raymonds.

INVENTORS.
Oliver L. F. Browne and George A. Porter
per Duell, Laass & Hey
their attorneys (No Model.) 2 Sheets—Sheet 2.

O. L. F. BROWNE & G. A. PORTER.
Apparatus for the Manufacture of Salt.

No. 240,378. Patented April 19, 1881.

UNITED STATES PATENT OFFICE.

OLIVER L. F. BROWNE AND GEORGE A. PORTER, OF SYRACUSE, NEW YORK.

APPARATUS FOR THE MANUFACTURE OF SALT.

SPECIFICATION forming part of Letters Patent No. 240,378, dated April 19, 1881.

Application filed December 9, 1880. (No model.)

*To all whom it may concern:*

Be it known that we, OLIVER L. F. BROWNE and GEORGE A. PORTER, of Syracuse, in the county of Onondaga, in the State of New York, have invented new and useful Improvements in Apparatus for the Manufacture of Salt, of which the following, taken in connection with the accompanying drawings, is a full, clear, and exact description.

The nature of this invention consists, essentially, of a salt-water-evaporating apparatus divided into two or more sections, one or a portion of which is designed to heat or partially evaporate the brine and eliminate therefrom the impurities preparatory to the introduction of said purified brine into the other section of the evaporating apparatus, there, by further evaporation, to be crystallized and reduced to salt.

The invention also consists in the combination, with the aforesaid first section, which constitutes the purifier of the brine, of certain peculiar means for heating the evaporating-vessels of said section by steam, whereby a more uniform distribution of heat throughout the series of said vessels is obtained, and said heat is applied at a lower average degree, thus preventing too close adhesion of the incrusting impurities of the brine in the evaporating-vessels and rendering the removal of said incrustations and impurities easy and expeditious, all as hereinafter more fully described.

Figure 1:
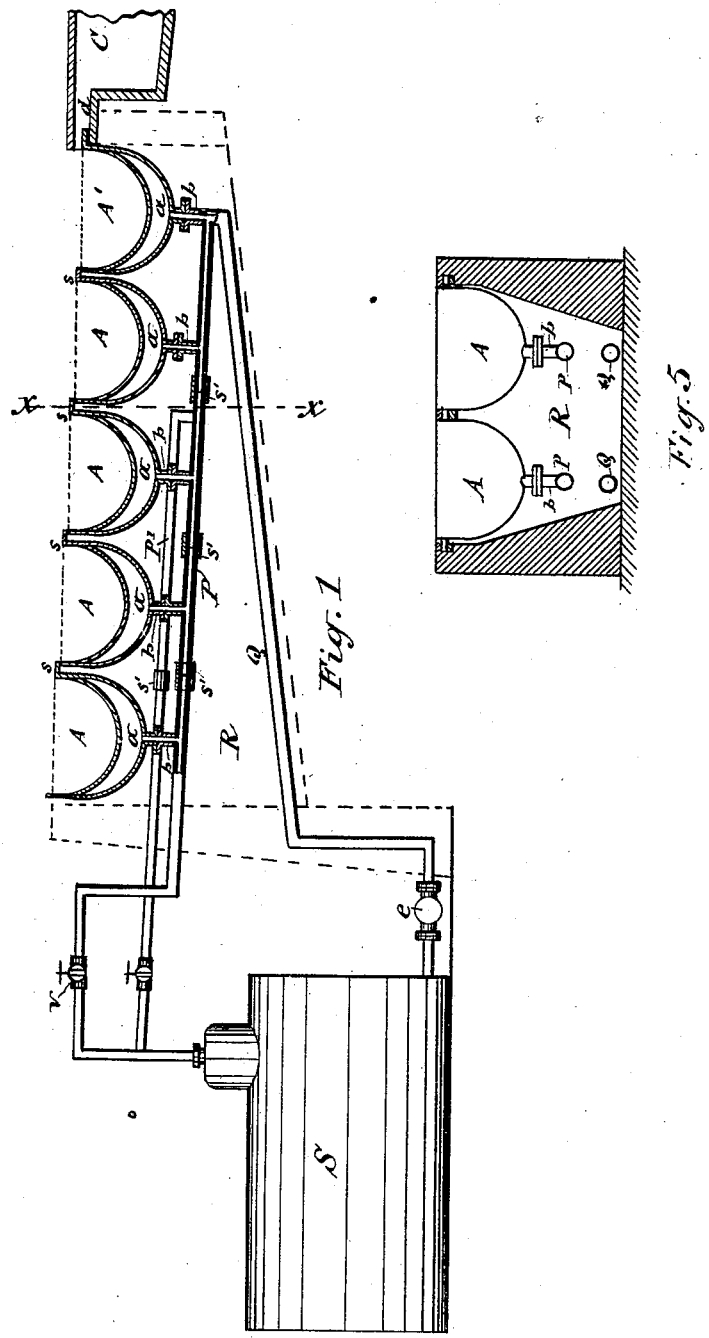
Figure 2:
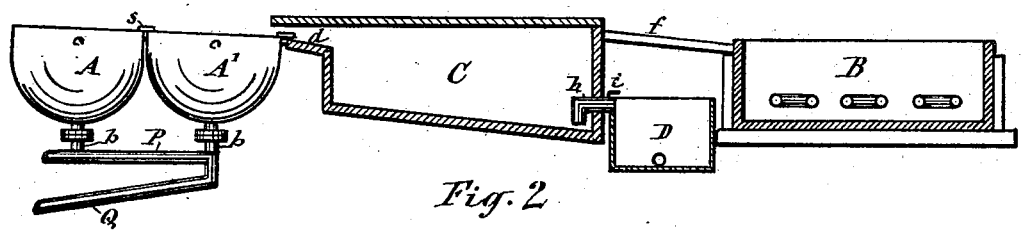
Figure 3:
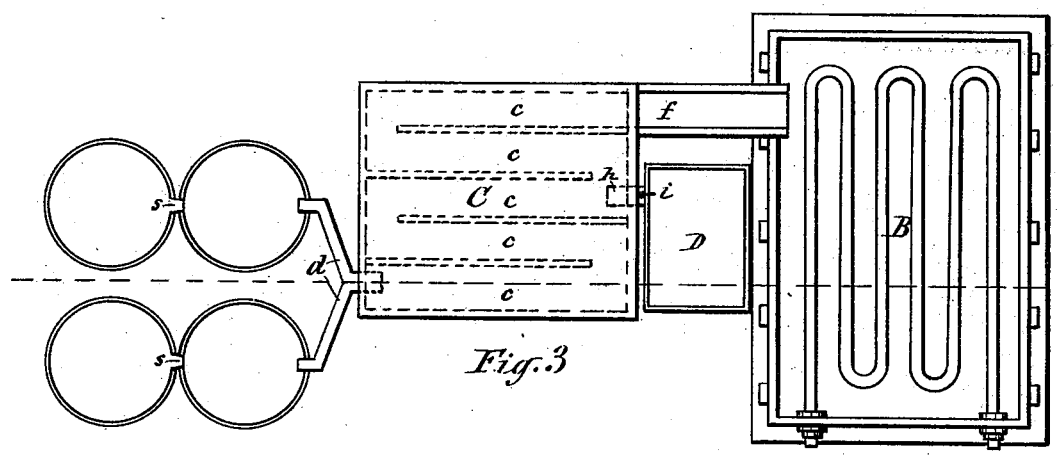
Figure 4:
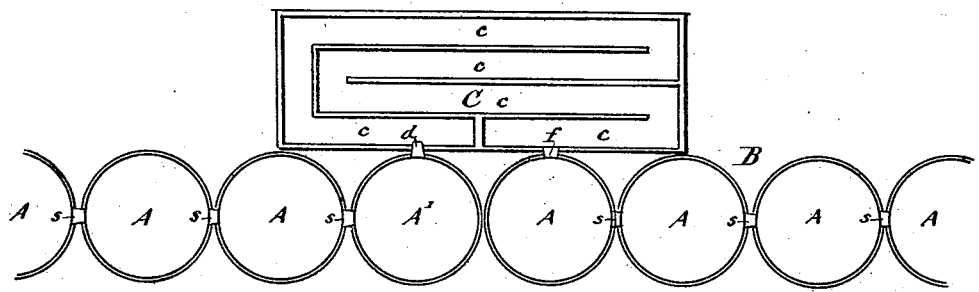

In the accompanying drawings, Figure 1 is a longitudinal section of that part of our invention in which the brine is designed to be reduced to saturation; Fig. 2, a longitudinal section of that part which receives the heated or partially-evaporated brine from the apparatus shown in Fig. 1, and completes the elimination of the impurities from said brine preparatory to being reduced to salt in the succeeding evaporating apparatus. Fig. 3 is a plan view of the apparatus shown in Fig. 2. Fig. 4 illustrates modifications in the arrangement of the purifying-tank aforesaid in relation to the evaporating-vessels; and Fig. 5 is a transverse section on line $x\,x$ in Fig. 1.

Similar letters of reference indicate corresponding parts.

A A represent a series of kettles or evaporating-vessels, designed to partially evaporate the brine and reduce the same to a point of saturation, or about 96° salimeter, at which stage the plaster and other readily-precipitable matter with which natural brines are usually contaminated becomes precipitated in the brine. Said vessels are hung over an airtight cell or chamber, R, which extends up the sides of said vessels, and is hermetically sealed around the top edge thereof, so as to form a dead-air space, and thus to effectually prevent radiation of heat from the steam-pipe P, as illustrated in Fig. 5 of the drawings. The bottom of the vessels A A is provided with a steam-jacket, $a'$, which, by a steam-duct, $b$, communicates with and receives steam from a steam-pipe, P, extended from a suitable steam-generator, S, a suitable valve, $v$, in the pipe P controlling the flow of steam and its application to the respective vessels A A.

In order to properly and conveniently dispose of the condensed steam in the pipe P and steam-spaces $a$, we arrange the pipe P under the jackets $a$ and incline it from that one of the vessels A into which the steam from the steam-generator S first enters toward that one of the vessels A most remote from this first vessel A, and tap the respective steam-jackets $a$, at their bottom or lowest point, by vertical steam-ducts or branch pipes $b$, connected with pipe P, thereby allowing the condensed steam to flow from the jackets $a$ to the pipe P and on to the extremity of said pipe. A return-pipe, Q, extended from the said extremity of the pipe P to the water-space of the boiler or steam-generator S, and provided with a check-valve or an injector, $e$, conveys the condensed steam back to the said steam-generator.

In extensive evaporating-works we employ an additional or auxiliary steam-supply pipe, P', for the purpose of obtaining a more uniform distribution of heat and preventing excessive condensation of the steam, said pipe being extended from the steam-generator and intersecting the main pipe P at the point where a re-enforcement of the supply of steam may be required.

The kettles or vessels A A are arranged in different planes and descending from that vessel or kettle into which the steam first enters toward that one more remote therefrom, and each vessel communicates with its respective succeeding vessel by a spout or suitable duct, s, at or near the top of the vessels, as best seen in Fig. 1 of the drawings.

The brine to be evaporated is conveyed to the most elevated vessel by a suitable conduit, and thence allowed to flow from vessel to vessel throughout the series by the ducts s aforesaid. The lowest vessel of a section, as A', communicates with a tank, C, by a suitable conduit, d, which allows the brine to flow from the series of evaporating-vessels A A to said tank. This tank C is designed to be connected with the evaporating apparatus at or near a point where the brine has reached saturation, or about 96° salimeter, at which stage the plaster and other readily-precipitable matter usually accompanying natural brines becomes precipitated. The ebullition of the brine in the vessels A, retarding the precipitation of the plaster, causes a portion of said plaster to accompany the brine in its passage to the tank C. The latter is isolated from the heat of the evaporating apparatus, and has its discharge or overflow f nearly on a level with the ingress d, so as to retard the flow of the brine and bring it near a state of rest, thereby allowing the plaster and other matter to precipitate and settle upon the bottom of the tank C and the supernatant pure brine to flow through the overflow or discharge conduit f to a suitable evaporating apparatus, B, in which latter said purified brine is finally evaporated and reduced to salt.

In order to afford ample time for the precipitation of the plaster and other matter during the passage of the brine through the tank C, said tank is provided with partitions extending alternately from opposite sides part way across the tank, forming a serpentine or circuitous passage, c, as illustrated by dotted lines in Fig. 3 of the drawings. A cover applied to the top of the tank C excludes dust and protects the brine generally while in its tranquil condition and in a comparatively cool position.

By inclining the bottom of the tank C and tapping the deepest part of the said tank at or near the bottom, the bitter water, or chloride of calcium and chloride of magnesium, which is usually found in the bottom stratum of the brine, can be drawn off or eliminated from the brine. This is effectually accomplished by a vat or receptacle, D, located relatively lower than the tank C, and having a pipe, h, which penetrates the side of said tank, and has at the interior thereof a pendent elbow terminating with an open end at a sufficient distance from the bottom of the tank C to avoid contact with and become choked by the sediment which may gather on said bottom. A suitable valve, i, applied to the pipe h, serves to control the egress of the bitter water and to prevent the escape of pure brine.

To adapt our invention to salt-works employing kettles exclusively for evaporating brine, we separate the series of kettles at a point where the brine attains saturation by closing the direct communication between the kettles at that point and making one section of the series serve as the purifying apparatus and the other section constitute the evaporating or graining apparatus proper, in which the brine is finally reduced to salt. The two separated kettles are made to communicate with a settling or purifying tank, C, placed at the side of the kettles and conveying the brine from one section of the series of kettles through a circuitous and nearly level passage to the other section of said series, as shown in Fig. 4 of the drawings. Said tank allows the plaster attending the brine to precipitate and collect upon the bottom of the tank, and the pure supernatant brine to pass onto the succeeding section of the series of kettles, thus producing the same result reached by the arrangement shown in Figs. 2 and 3 of the drawings.

In order to allow the steam-pipe P to expand and contract without disturbing the vessels A A, we construct the steam-pipe P of two or more sections, connected by sleeves or telescopic joints s', as illustrated in Fig. 1 of the drawings.

Having thus described our invention, what we claim is—

1. The combination, with the steam-pipe P, communicating with the steam-jacketed kettles, as described, of the return-pipe Q, substantially as shown and set forth.

2. The combination, with the steam-pipe P, communicating with the steam-jacketed kettles, as shown, of the auxiliary steam-pipe P', arranged to re-enforce the flow of steam substantially in the manner specified and set forth.

3. In combination with the steam-jacketed kettles A A, a steam-generator, a steam-pipe provided with a throttle-valve and with branch pipes communicating with the steam-jackets of aforesaid kettles, and a return-pipe for condensed steam, extended from the extremity of the steam-pipe to the water-space of the steam-generator, and provided with a check-valve or an injector, substantially as described and shown.

4. The combination and arrangement of two evaporating apparatus and a tank arranged to receive the top stratum of the partially-evaporated brine from one of said apparatus and discharge the top stratum of its own contents into the other evaporating apparatus, substantially as and for the purpose set forth.

5. The combination, with the evaporating apparatus A and B, of a tank interposed between said two apparatus, and having at or near its top an inlet communicating with the top portion of the apparatus A, and an overflow or outlet nearly on a level with the inlet and communicating with the apparatus B, substantially as described and shown.

6. In combination with the evaporating-vessels A and B, the tank C, having the tortuous or circuitous passage c, as described and shown.

7. In combination with the evaporating-vessels A and B, the tank C, provided with an inclined bottom, substantially as and for the purpose shown and described.

8. In combination with the evaporating-vessels A and B and the tank C, the receptacle D, arranged to draw from said tank the bottom stratum of the brine contained therein, substantially as described, for the purpose set forth.

9. The combination of the evaporating-vessels A A, communicating with each other at or near the top, and provided with the steam-jackets $a$, and the steam-pipe P, communicating with the respective steam-jackets, substantially as described and shown.

10. The combination and arrangement of a series of vessels, A A, communicating with each other at or near the top, and the tank C, communicating with one or more of said vessels, substantially as and for the purpose set forth.

11. In combination with the series of kettles A A, provided, respectively, with the steam-jacket $a$, the pipe P, provided with one or more telescopic joints, $s'$, substantially as described and shown, for the purpose set forth.

12. The within-described evaporating apparatus, consisting of evaporating-vessels provided with steam-jackets, a steam-pipe communicating with said steam-jackets, and a hermetically-sealed inclosure surrounding the exterior of the evaporating-vessels, and the steam-jackets and steam-pipe aforesaid, substantially as and for the purpose set forth.

In testimony whereof we have hereunto signed our names and affixed our seals, in the presence of two attesting witnesses, at Syracuse, in the county of Onondaga, in the State of New York, this 4th day of December, 1880.

OLIVER L. F. BROWNE. [L. S.]
  GEORGE A. PORTER.  [L. S.]

Witnesses:
 WILSON R. HARE,
 ED. DARIER.